US010127797B2

(12) United States Patent
Probin et al.

(10) Patent No.: US 10,127,797 B2
(45) Date of Patent: Nov. 13, 2018

(54) ALTERNATIVE INEXPENSIVE CLOUD-BASED MASS MARKET ALARM SYSTEM WITH ALARM MONITORING AND REPORTING

(71) Applicant: Honeywell International Inc., Morristown, NJ (US)

(72) Inventors: Robert John Probin, South Lanarkshire (GB); Laurent Legris, Mougins (FR)

(73) Assignee: HONEYWELL INTERNATIONAL INC., Morristown, NJ (US)

(*) Notice: Subject to any disclaimer, the term of this patent is extended or adjusted under 35 U.S.C. 154(b) by 0 days.

(21) Appl. No.: 14/623,698

(22) Filed: Feb. 17, 2015

(65) Prior Publication Data
US 2016/0240074 A1 Aug. 18, 2016

(51) Int. Cl.
G08B 1/08 (2006.01)
G08B 25/10 (2006.01)
G08B 17/00 (2006.01)
G08B 13/24 (2006.01)
G08B 25/00 (2006.01)

(52) U.S. Cl.
CPC ......... *G08B 25/10* (2013.01); *G08B 13/2491* (2013.01); *G08B 17/00* (2013.01); *G08B 25/009* (2013.01)

(58) Field of Classification Search
CPC .... G08B 27/00; G08B 27/001; G08B 27/005; G08B 27/006; G08B 25/00; G08B 25/14
See application file for complete search history.

(56) References Cited

U.S. PATENT DOCUMENTS

| 7,389,528 | B1 | 6/2008 | Beser | |
| 7,936,286 | B2* | 5/2011 | Adair | G08B 27/00 340/905 |
| 8,179,256 | B2* | 5/2012 | Crisp | G08B 25/08 340/541 |
| 8,289,161 | B2* | 10/2012 | Hosey | G08B 25/08 340/540 |
| 2007/0194906 | A1 | 8/2007 | Sink | |
| 2009/0077167 | A1 | 3/2009 | Baum et al. | |
| 2013/0285799 | A1 | 10/2013 | Probin et al. | |

(Continued)

FOREIGN PATENT DOCUMENTS

WO 2016/133269 A1 8/2016

OTHER PUBLICATIONS

Semtech, Semtech Wireless Products, Nov. 4, 2014.*

(Continued)

*Primary Examiner* — Ryan Sherwin
(74) *Attorney, Agent, or Firm* — Husch Blackwell LLP

(57) ABSTRACT

A security system including a wireless alarm sensor that detects a threat within a secured geographic area, a cloud application that monitors the alarm sensor and reports threats detected by the alarm sensor within the secured area to a human user of the secured area and a wireless publically accessible communication system defined by a plurality of relatively low power communication devices and a local base station, the alarm sensor detects a nearby one of the plurality of low power communication devices and wirelessly connects to the cloud application through the nearby one low power communication device and local base station.

18 Claims, 1 Drawing Sheet

(56) References Cited

U.S. PATENT DOCUMENTS

| | | | | |
|---|---|---|---|---|
| 2013/0321161 | A1* | 12/2013 | Chen | G08B 17/00 |
| | | | | 340/628 |
| 2014/0077944 | A1* | 3/2014 | Baskin | H04Q 9/00 |
| | | | | 340/539.1 |
| 2014/0218517 | A1* | 8/2014 | Kim | H04L 12/2818 |
| | | | | 348/143 |
| 2014/0281742 | A1 | 9/2014 | Probin et al. | |
| 2014/0313032 | A1* | 10/2014 | Sager | H04Q 9/00 |
| | | | | 340/539.17 |
| 2015/0015401 | A1 | 1/2015 | Wedig et al. | |
| 2015/0022347 | A1 | 1/2015 | Aswath et al. | |
| 2015/0339912 | A1* | 11/2015 | Farrand | G08B 25/00 |
| | | | | 340/501 |

OTHER PUBLICATIONS

European examination report from corresponding EP patent application 16155077.7, dated Oct. 31, 2016.
Extended European search report from corresponding EP patent application 16155077.7, dated Jun. 3, 2016.
Intention to Grant Rule 71(3) EPC communication for corresponding EP patent application 16155077.7, dated Apr. 16, 2018.
Air-Lynx SAS, Air-Lynx 4G—Overview, Private LTE Networks Dedicated to Professional Requirements, http://air-lynx.com/home, 2014.
Machina Research, White Paper for Neul, The need for low cost, high reach, wide area connectivity for the Internet of Things, A Mobile Network Operator's perspective, Machina Research, 2014.

* cited by examiner

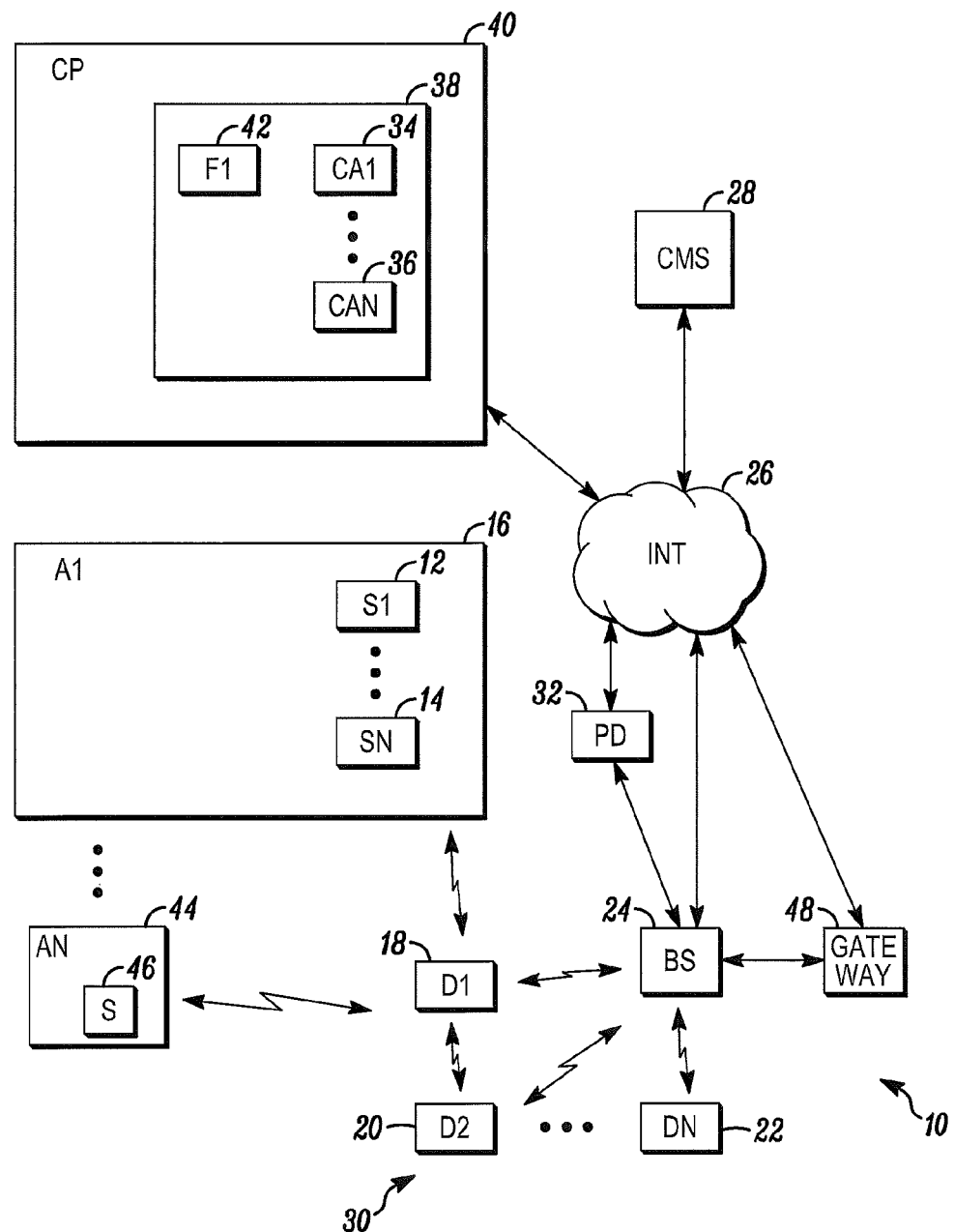

ALTERNATIVE INEXPENSIVE CLOUD-BASED MASS MARKET ALARM SYSTEM WITH ALARM MONITORING AND REPORTING

FIELD

This application relates to security systems and more particular to security systems for small areas.

BACKGROUND

Systems are known to protect people and assets within secured areas. Such systems are typically based upon the use of one more sensors that detect threats within the secured area.

Threats to people and assets may originate from any of number of different sources. For example, a fire may kill or injure occupants who have become trapped by a fire in a home. Similarly, carbon monoxide from a fire may kill people in their sleep.

Alternatively, an unauthorized intruder, such as a burglar, may present a threat to assets within the area. Intruders have also been known to injure or kill people living within the area.

In the case of intruders, sensors may be placed in different areas based upon the respective uses of those areas. For example, if people are present during some portions of a normal day and not at other times, then sensors may be placed along a periphery of the space to provide protection while the space is occupied while additional sensors may be placed within an interior of the space and used when the space is not occupied.

In most cases, threat detectors are connected to a local control panel. In the event of a threat detected via one of the sensors, the control panel may sound a local audible alarm. The control panel may also send a signal to a central monitoring station.

While conventional security systems work well, they are sometimes overly complex and expensive. Accordingly, a need exists for better methods and apparatus for protecting secured areas.

BRIEF DESCRIPTION OF THE DRAWINGS

FIG. 1 illustrates a block diagram of a security system in accordance herewith.

DETAILED DESCRIPTION

While disclosed embodiments can take many different forms, specific embodiments thereof are shown in the drawings and will be described herein in detail with the understanding that the present disclosure is to be considered as an exemplification of the principles thereof as well as the best mode of practicing same, and is not intended to limit the application or claims to the specific embodiment illustrated.

FIG. 1 is a block diagram of a security system 10 shown generally in accordance with an illustrated embodiment. Included within the system may be one or more threat sensors 12, 14 that detect threats within a secured geographic area 16.

Threats to security and/or safety within the secured area may arise from any of a number of different sources. Accordingly, at least some of the sensors may be intrusion detectors embodied as limit switches placed on the doors and/or windows providing entrance into and egress from the secured area. Other of the sensors may be motion sensors (e.g., passive infrared (PIR) detectors, television cameras with motion detection, etc.) placed within the interior of the space. Still other of the detectors may be smoke or gas detectors.

One or more cloud apps 34, 36 may monitor the sensors. Upon activation of one of the sensors, the cloud app may send an alarm message to a central monitoring station 28. The central monitoring station may respond by summoning the appropriate help (e.g., police, fire department, etc.).

The cloud app may also send the alarm message to a portable wireless device 32 carried by a human user. The human user is an authorized occupant of the secured area.

The sensors are wireless devices that communicate with the cloud app through a publically accessible communication system based upon the use of a low power wide area network (LPWAN) 30 including an associated base station 24. The base station and cloud app may, in turn, communicate through the Internet 26.

The LPWAN network may be defined by a number of low power devices 18, 20, 22 based upon the use of any of a number of technologies (e.g., Semtech LoRa, Cellular Modules designed for machine-to-machine (M2M) applications, Weightless, Sigfox, POPS, Air Lynx. As is known, LPWAN systems are relatively long range, provide very low cost connectivity, have long battery life and only occasionally need to send and receive messages.

In general, the cloud apps 34, 36 are computer programs loaded from a non-transitory computer readable medium (memory) 38 that execute on one or more processor apparatus (i.e., a cloud processor) 40. As used herein reference to a step performed by a cloud app is also reference to the processor that executed that step.

The cloud apps and cloud processors have no geographic relationship with the secured geographic area. As is known, a cloud app is usually executed on a publically accessible cloud processor often for a small fee or no fee whatsoever.

The secured geographic areas may have only a single or only a small number of sensors. The sensors may be battery powered.

The sensors each include a sensing element that senses a threat parameter (e.g., intrusion, fire, etc.). The sensors also include control circuitry (e.g., a processor and associated computer programs) that compares the sensed parameter with one or more threshold values and reports events to the cloud app through a corresponding wireless transceiver.

Upon detecting a threat, a sensor begins searching for a nearby LPWAN device that is part of a local LPWAN network. Upon detecting a nearby device, the sensor selects the device and composes an alarm message for transfer to the cloud app. The message may include an IP address of the cloud app, an identifier of the sensor, an identifier of the secured area (e.g., address, account number, etc.) and the time.

The selected LPWAN device receives the alarm message and transfers it to the base station. The selected device may send the message directly or through one or more other LPLAN low power devices. This may be the case because the selected LPWAN device may be too far from the base station to send the message directly. Instead, the other LPWAN device operates as a relay to receive and retransmit the message to the base station. In one embodiment, the LPWAN device may be incorporated into be a part of the sensor.

The base station receives the message and forwards the message through the Internet to the cloud app. The cloud app may receive and authenticate the message by reference to a reference file 42. Authentication may be based upon an electronic serial number of the sensor, account number or by comparing any other feature of the alarm message with a content of the reference file.

Upon authenticating the alarm message, the cloud app may send a corresponding alarm message to the central monitoring station. As with the message from the sensor, the alarm message may include an identifier of the sensor, the location, the type of threat detected and the time.

In addition to or as an alternative to sending the alarm message to the central monitoring station, the cloud app may also send an alarm message to the portable device of the human user. The alarm message sent to the user may include an identifier of the sensor, the location, the type of threat detected and the time. The message may be automatically displayed on a screen of the portable device.

In another embodiment, the cloud app may be executed on the local base station. In this case, the alarm message to the human user may originate from the local base station.

In another embodiment, the alarm system may service a number of separate secure geographic areas 16, 44 owned by completely separate entities. In this case, a regional gateway 48 may be used to reduce the data processing requirements of the cloud app. In this case, duplicate messages from the same sensors or from multiple sensors in the same secured area or nearby secured areas can be partitioned or otherwise consolidated. Alternatively, fault management may be handled within the gateway. Similarly, user command processing and alarm analysis may be handled within the gateway rather than the cloud.

The use of LPWAN technology for connecting sensors to cloud apps offers a number of benefits. For example, the use of a LPWAN provides a low cost solution that is of significance value in smaller systems (e.g., residential, small commercial, etc.) and especially where backup communication paths are not required.

The system achieves additional benefits by reducing equipment complexity within the secured area. The system eliminates the cost for providing routers/gateways within the secured area along with the need for backup power for the support of any routers/gateways that would otherwise be required within the secured area.

Some LPWAN technologies allow peer-to-peer communication as well as long distance communications. The peer-to-peer feature avoids black spots associated with sensors placed too far from a base station by performing a local hop for messages from a first device (node) to another local node (sensor/actuator) using the same wireless transceiver technology.

The nodes of a LPWAN system reduces power usage among transmitters, by preferentially using modes with better signal strength to incrementally connect with long distance base stations. The nodes equalize node battery life across all system nodes by communicating at lower power with nearby nodes (having a higher power reserve) and allowing the nearby nodes to send the long distance (higher power) transmissions to the base station.

A security system based upon LPWAN technology also makes the system robust against power attacks directed to disabling the system. The system is also resistant to directed communication system attacks. For example, many security systems of previous designs have required multiple, independent communication paths in order to provide robustness against failure or sabotage of one or more communications paths. However, the system of FIG. 1 includes a number of features that obviate these concerns. For example, each LPWAP device is likely in range of more than one "long distance" base station, and this can provide an alternate route. If a specific LPWAN device only has one "long distance" base station, other low power devices may have multiple routes out and this system into the nodes of another LPWAN system and its local nodes can provide a temporary path for get a signal in and out.

Depending upon the wireless communication method chosen, multiple channels or spread-spectrum can be used to avoid jamming. If one node is inaccessible, it does not disable the whole system as it would with a single path based upon a single gateway/router.

The system of FIG. 1 could also implement additional backup paths. For example, one or more of the low power nodes could have a totally independent communication backup link (e.g., leased line, copper wire using ADSL broadband connection, fiber optic broadband connection, etc.). Other system nodes can communicate with this node in the event of a failure of all long distance wireless communication connections. This is a possible upgrade to the system of FIG. 1, rather than a mandatory part of the basic system as in prior art systems. Because of the robustness and diversity of the communication paths, the server/cloud application hosting the panel application knows very quickly that site devices are having communication difficulties and can take appropriate action.

In general, the system of FIG. 1 includes a wireless alarm sensor that detects a threat within a secured geographic area, a cloud application that monitors the alarm sensor and reports threats detected by the alarm sensor within the secured area to a human user of the secured area and a wireless publically accessible communication system defined by a plurality of relatively low power communication devices and a local base station, the alarm sensor detects a nearby one of the plurality of low power communication devices and wirelessly connects to the cloud application through the nearby one low power communication device and local base station.

Alternatively, the system includes a wireless sensor that detects threats within a secured geographic area, a cloud application that monitors the sensor and reports threats detected by the sensor within the secured area to a human user of the secured area and at least one relatively low power, publically accessible, wireless communication device and a local base station, the wireless sensor detects the at least one low power communication devices and connects to the cloud application through the at least one low power communication device and local base station.

Alternatively, the system includes a wireless alarm sensor that detects a threat within a secured geographic area, a cloud application that monitors the alarm sensor and reports threats detected by the alarm sensor within the secured area to a human user of the secured area, a wireless publically accessible communication system defined by a plurality of relatively low power communication devices and a local base station, the alarm sensor detects a nearby one of the plurality of low power communication devices and wirelessly connects to the cloud application through the nearby one communication device and local base station and a backup communication link that couples the wireless alarm sensor to the cloud application, the backup communication link including at least one of a leased line, a digital subscriber line, and a fiber optic cable.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown, or sequential order, to achieve desirable results. Other steps may be provided, or steps may be eliminated, from the described flows, and other components may be add to, or removed from the described embodiments.

The invention claimed is:

1. A system comprising:
a first wireless alarm sensor that detects a first threat within a first secured geographic area;
a second wireless alarm sensor that detects the first threat within the first secured geographic area;
a gateway that consolidates duplicate messages from the first wireless alarm sensor and the second wireless alarm sensor;
a first non-transitory computer readable medium coupled to the gateway that stores a first cloud application that monitors the first and second wireless alarm sensors and reports the first threat detected by the first wireless alarm sensor or the second wireless alarm sensor within the first secured geographic area to a first human user associated with the first secured geographic area; and
a wireless publically accessible communication system defined by a plurality of low power communication devices and a base station,
wherein the base station is located outside of the first secured geographic area,
wherein the wireless publically accessible communication system comprises a low power wide area network (LPWAN) via which the plurality of low power communication devices communicate,
wherein, upon the first wireless alarm sensor or the second wireless alarm sensor detecting the first threat within the first secured geographic area, the first wireless alarm sensor or the second wireless alarm sensor searches for one of the plurality of low power communication devices,
wherein the first wireless alarm sensor or the second wireless alarm sensor detects the one of the plurality of low power communication devices and wirelessly connects to the first cloud application through the one of the plurality of low power communication devices and the base station, and
wherein the LPWAN uses a technology from a group consisting of Semtech LoRa™, Cellular Modules designed for machine-to-machine applications, Weightless™, Sigfox™, POPS, and Air Lynx.

2. The system as in claim 1 wherein the gateway processes first signals from the first wireless alarm sensor and the second wireless alarm sensor and forwards the first signals from the first wireless alarm sensor and the second wireless alarm sensor to the first human user.

3. The system as in claim 2 wherein the gateway is regional and processes other signals from other alarm sensors protecting other secured geographic areas and reports other threats to other human users.

4. The system as in claim 3 wherein the first non-transitory computer readable medium stores a separate cloud application that monitors the other alarm sensors and reports the other threats to the other human users.

5. The system as in claim 3 wherein the gateway comprises a second non-transitory computer readable medium that stores a separate cloud application that partitions detection and reporting for the other secured geographic areas.

6. The system as in claim 1 wherein the first wireless alarm sensor comprises one or more of an intrusion sensor and a fire sensor.

7. The system as in claim 1 further comprising a processor that reports the first threat to a central monitoring station.

8. The system as in claim 7 further comprising a portable wireless device that receives a notification of the first threat.

9. A system comprising:
a first wireless alarm sensor that detects a first threat within a first secured geographic area;
a second wireless alarm sensor that detects the first threat within the first secured geographic area;
a gateway that consolidates duplicate messages from the first wireless alarm sensor and the second wireless alarm sensor;
a first non-transitory computer readable medium coupled to the gateway that stores a first cloud application that monitors the first and second wireless alarm sensors and reports the first threat detected by the first wireless alarm sensor or the second wireless alarm sensor within the first secured geographic area to a first human user associated with the first secured geographic area;
a plurality of low power, publically accessible, wireless communication devices; and
a base station,
wherein the base station is located outside of the first secured geographic area,
wherein the plurality of low power, publically accessible, wireless communication devices communicates via a low power wide area network (LPWAN),
wherein, upon the first wireless alarm sensor or the second wireless alarm sensor detecting the first threat within the first secured geographic area, the first wireless alarm sensor or the second wireless alarm sensor searches for one of the plurality of low power, publically accessible, wireless communication devices,
wherein the first wireless alarm sensor or the second wireless alarm sensor detects the one of the plurality of low power, publically accessible, wireless communication devices and connects to the first cloud application through the one of the plurality of low power, publically accessible, wireless communication devices and the base station, and
wherein the LPWAN uses a technology from a group consisting of Semtech LoRa™, Cellular Modules designed for machine-to-machine applications, Weightless™, Sigfox™, POPS, and Air Lynx.

10. The system as in claim 9 wherein the gateway processes first signals from the first wireless alarm sensor and the second wireless alarm sensor and forwards the first signals to the first human user.

11. The system as in claim 10 wherein the gateway is regional and processes other signals from other alarm sensors protecting other secured geographic areas and reports other threats to other human users.

12. The system as in claim 11 wherein the first non-transitory computer readable medium stores a separate cloud application that monitors the other alarm sensors and reports the other threats to the other human users.

13. The system as in claim 11 wherein the gateway comprises a second non-transitory computer readable medium that stores a separate cloud application that partitions detection and reporting for the other secured geographic areas.

14. The system as in claim 9 wherein the first wireless alarm sensor comprises one or more of an intrusion sensor and a fire sensor.

15. The system as in claim 9 further comprising a processor that reports the first threat to a central monitoring station.

16. The system as in claim 9 further comprising a portable wireless device carried by the first human user that receives an alarm message reporting the first threat.

17. A system comprising:
a first wireless alarm sensor that detects a threat within a secured geographic area;
a second wireless alarm sensor that detects the threat within the secured geographic area;
a gateway that consolidates duplicate messages from the first wireless alarm sensor and the second wireless alarm sensor;
a non-transitory computer readable medium coupled to the gateway that stores a cloud application that monitors the first and second wireless alarm sensors and reports the threat detected by the first wireless alarm sensor or the second wireless alarm sensor within the secured geographic area to a human user associated with the secured geographic area;
a wireless publically accessible communication system defined by a plurality of low power communication devices and a base station; and
a backup communication link that couples the first and second wireless alarm sensors to the cloud application,
wherein the base station is located outside of the secured geographic area,
wherein the wireless publically accessible communication system comprises a low power wide area network (LPWAN) via which the plurality of low power communication devices communicate,
wherein, upon the first wireless alarm sensor or the second wireless alarm sensor detecting the threat within the secured geographic area, the first wireless alarm sensor or the second wireless alarm sensor searches for one of the plurality of low power communication devices,
wherein the first wireless alarm sensor or the second wireless alarm sensor detects the one of the plurality of low power communication devices and wirelessly connects to the cloud application through the one of the plurality of low power communication devices and the base station,
wherein the backup communication link includes at least one of a leased line, a digital subscriber line, and a fiber optic cable, and
wherein the LPWAN uses a technology from a group consisting of Semtech LoRa™, Cellular Modules designed for machine-to-machine applications, Weightless™, Sigfox™, POPS, and Air Lynx.

18. The system as in claim 17 wherein the gateway transmits an alarm message reporting the threat to the human user.

* * * * *